US007474661B2

(12) United States Patent
Sturm et al.

(10) Patent No.: US 7,474,661 B2
(45) Date of Patent: Jan. 6, 2009

(54) APPARATUS AND METHOD FOR DISTRIBUTING FORWARDING TABLE LOOKUP OPERATIONS AMONG A PLURALITY OF MICROENGINES IN A HIGH-SPEED ROUTING NODE

(75) Inventors: Patricia Kay Sturm, McKinney, TX (US); Patrick W. Ireland, Sanger, TX (US); Jack C. Wybenga, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 773 days.

(21) Appl. No.: 10/811,411

(22) Filed: Mar. 26, 2004

(65) Prior Publication Data

US 2005/0213585 A1 Sep. 29, 2005

(51) Int. Cl.
*H04L 12/56* (2006.01)
(52) U.S. Cl. .................................. 370/395.31; 370/229
(58) Field of Classification Search ................. 370/412, 370/389, 258, 255, 392; 709/228, 226, 238, 709/203
See application file for complete search history.

(56) References Cited

U.S. PATENT DOCUMENTS

| | | | | |
|---|---|---|---|---|
| 5,485,455 A * | 1/1996 | Dobbins et al. | ............. | 370/255 |
| 6,078,963 A * | 6/2000 | Civanlar et al. | ............. | 709/238 |
| 6,356,627 B1 * | 3/2002 | Hayball et al. | ......... | 379/112.01 |
| 6,640,239 B1 * | 10/2003 | Gidwani | ...................... | 709/203 |
| 6,661,794 B1 * | 12/2003 | Wolrich et al. | ............. | 370/394 |
| 6,791,970 B1 * | 9/2004 | Ng et al. | ...................... | 370/352 |
| 6,826,195 B1 * | 11/2004 | Nikolich et al. | ............. | 370/465 |
| 6,947,425 B1 * | 9/2005 | Hooper et al. | ............. | 370/394 |
| 7,006,495 B2 * | 2/2006 | Hooper | ...................... | 370/389 |
| 7,010,607 B1 * | 3/2006 | Bunton | ...................... | 709/228 |
| 7,013,353 B2 * | 3/2006 | Parthasarathy et al. | ......... | 710/7 |
| 7,032,031 B2 * | 4/2006 | Jungck et al. | ............... | 709/246 |
| 7,082,104 B2 * | 7/2006 | Wolrich et al. | ............. | 370/236 |
| 7,103,008 B2 * | 9/2006 | Greenblat et al. | ........... | 370/258 |
| 7,107,329 B1 * | 9/2006 | Schroder et al. | ............ | 709/221 |
| 7,111,071 B1 * | 9/2006 | Hooper | ...................... | 709/238 |
| 7,113,985 B2 * | 9/2006 | Narad et al. | ................. | 709/221 |
| 7,139,271 B1 * | 11/2006 | Parruck et al. | .............. | 370/392 |
| 7,154,902 B1 * | 12/2006 | Sikdar | ........................ | 370/412 |
| 7,269,663 B2 * | 9/2007 | Beier et al. | .................. | 709/238 |
| 2003/0069973 A1 * | 4/2003 | Ganesan et al. | ............. | 709/226 |
| 2003/0147385 A1 * | 8/2003 | Montalvo et al. | ........... | 370/389 |
| 2004/0105447 A1 * | 6/2004 | Lee | ........................ | 370/395.32 |
| 2004/0196840 A1 * | 10/2004 | Amrutur et al. | .............. | 370/389 |
| 2005/0036445 A1 * | 2/2005 | Chien-Hsin | ................. | 370/229 |
| 2005/0060705 A1 * | 3/2005 | Katti et al. | ................... | 718/100 |
| 2007/0014276 A1 * | 1/2007 | Bettink et al. | ............... | 370/351 |

* cited by examiner

*Primary Examiner*—Thong H Vu (57) ABSTRACT

A router for interconnecting external devices coupled to the router. The router comprises a switch fabric and a plurality of routing nodes coupled to the switch fabric. Each routing node comprises packet processing circuitry for transmitting data packets to, and receiving data packets from, the external devices and transmitting data packets to, and receiving data packets from, other routing nodes via the switch fabric. The packet processing circuitry comprises a first network processor comprising: i) N microengines for forwarding the data packets, each of the microengines capable of executing a plurality of threads that perform forwarding table lookup operations; and ii) workload distribution circuitry for distributing data packets to the N microengines for forwarding.

14 Claims, 5 Drawing Sheets

APPARATUS AND METHOD FOR DISTRIBUTING FORWARDING TABLE LOOKUP OPERATIONS AMONG A PLURALITY OF MICROENGINES IN A HIGH-SPEED ROUTING NODE

TECHNICAL FIELD OF THE INVENTION

The present invention is generally directed to distributed architecture routers and, in particular, to a load balancing mechanism for distributing forwarding table lookup operations among a plurality processors within a routing node of a high-speed router.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of a new generation of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

When a data packet arrives in a conventional routing node, a forwarding engine in the routing node uses forwarding tables to determine the destination of the data packet. A conventional Internet Protocol (IP) router uses a dedicated forwarding table for each type of traffic, such as Internet Protocol version 4 (IPv4), Internet Protocol version 6 (IPv6) and MPLS.

Traditionally, data packets are forwarded in a router or switch by a single thread executed by a data processor. Fast hardware circuits are used to meet the throughput requirements for high-speed systems. If multiple threads are used to forward data packets, each thread typically specializes in handling a particular type of packet (i.e., each packet type is sent to a processing thread based on the packet type). This is typical of most scheduling systems. Such scheduling systems use a knowledge base that is searched according to type criteria (e.g., packet type). In either approach (i.e., single thread for all packet types or separate thread for each packet type), packet sequencing is automatically maintained because a single thread is used for each packet type. This prevents data packets from passing one another in processing.

However, if a single thread is used either to process each packet type or to process all packet types, it is not possible to achieve the throughput requirements of high-speed routers. Any splitting of the processing by packet type over multiple threads leads to a load-balancing dependence on traffic type. Eventually, normal statistical fluctuations in traffic types leads to cases where the forwarding resources (e.g., threads, microengines) for some packet types are overloaded, while forwarding resources of other packet types are idle. Thus, resources are wasted when non-optimal traffic mixtures are encountered.

Therefore, there is a need in the art for improved high-speed routers. In particular, there is a need for a high-speed router that can process data packets for different traffic types without overloading forwarding resources for some packet types, while forwarding resources for other data packet types are idle.

SUMMARY OF THE INVENTION

The present invention provides a mechanism that can be used to distribute forwarding table lookups among many microengines and threads. Load balancing occurs over both the microengines and the threads to allow high speed forwarding table lookup operations while at the same time maintaining packet order for each packet type. Distribution of the load across many microengines and threads enables the forwarding rates needed in high-speed routers (e.g., data rates in excess of 1 Gbps).

According to the principles of the present invention, a reader function distributes the forwarding lookups workload across many microengines and threads. Each of the microengines and threads runs identical code for performing forwarding table lookup. Each microengine and thread is capable of handling different data packet types (e.g., IPv4, IPv6, and MPLS). Thus, a round-robin scheme may be used to distribute data packets to the microengines and threads. An inner (or first) loop distributes data packets across microengines to assure load balancing across microengines. An outer (or second) loop then distributes the workload across the threads to allow multiple threads in a microengine to work on forwarding data packets.

Since threads within a microengine share more resources than threads in different microengines, the most important load-sharing task is to distribute the workload across the microengines first. The data packets are distributed by the reader function to the microengines and threads independent of the type of data packet. This allows good load balancing, regardless of the mixture of traffic types.

The present invention uses a strict round-robin distribution mechanism of data packets across all of the microengines and threads, regardless of packet type. After assigning a data packet to a thread within a microengine, the search for a thread with free resources continues from where the search left off. Thus, the search does not return to the top of the list of resources, thereby loading the top resources more heavily. The search loop continues, skipping busy resources until free resources are found. This allows hardware buffers for received packets to function, so data packets are not dropped until the hardware buffering is exhausted. Each forwarding thread is a finite state machine that finishes its work on the current packet and then becomes available to process more data packets. This approach combines the techniques of a hardware style arbiter with a complex state machine sequencer to create a unique load-sharing distribution solution.

Since many microengines and threads operate on packets of the same type, packet sequencing must be maintained because it is possible for a packet to pass another packet in the forwarding table lookup process. The variable depth of searches based on subnet mask makes this very likely. The reader function creates separate queues for each of the packet types (i.e., IPv4, IPv6, and MPLS). A packet sequence number is associated with each of the packets in each queue in order to maintain the order or sequence of data packets of each packet type. The writer function assures that packet sequence of outgoing packets is maintained for each packet type.

To address the above-discussed deficiencies of the prior art, it is a primary object of the present invention to provide a router for interconnecting external devices coupled to the router. According to an advantageous embodiment of the present invention, the router comprises: 1) a switch fabric; and 2) a plurality of routing nodes coupled to the switch fabric, wherein each of the plurality of routing nodes comprises packet processing circuitry capable of transmitting data packets to, and receiving data packets from, the external devices and further capable of transmitting data packets to, and receiving data packets from, other ones of the plurality of routing nodes via the switch fabric, wherein the packet processing circuitry comprises a first network processor comprising: i) N microengines capable of forwarding the data packets, each of the microengines capable of executing a plurality of threads that perform forwarding table lookup operations; and ii) workload distribution circuitry capable of distributing data packets to the N microengines for forwarding.

According to one embodiment of the present invention, the each microengine is capable of forwarding data packets of different traffic types.

According to another embodiment of the present invention, the different traffic types comprise IPv4, IPv6 and MPLS.

According to still another embodiment of the present invention, the first network processor comprises a reader microengine for receiving data packets into the first network processor and a writer microengine for transmitting the data packets from the first network processor.

According to yet another embodiment of the present invention, the first network processor transmits data packets of a first traffic type in the same order that the data packets of the first traffic type were received.

According to a further embodiment of the present invention, the workload distribution circuitry distributes a data packet to a first thread executed by each of the microengines before distributing a data packet to a second thread executed by any of the each microengines.

According to a still further embodiment of the present invention, the workload distribution circuitry distributes a data packet to a first thread executed by each of the microengines according to a round-robin algorithm.

According to a yet further embodiment of the present invention, the router further comprises a second network processor similar to the first network processor, wherein the first network processor transfers data packets from the switch fabric to external ports of the router and the second network processor transfers data packets from the external ports of the router to switch fabric.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
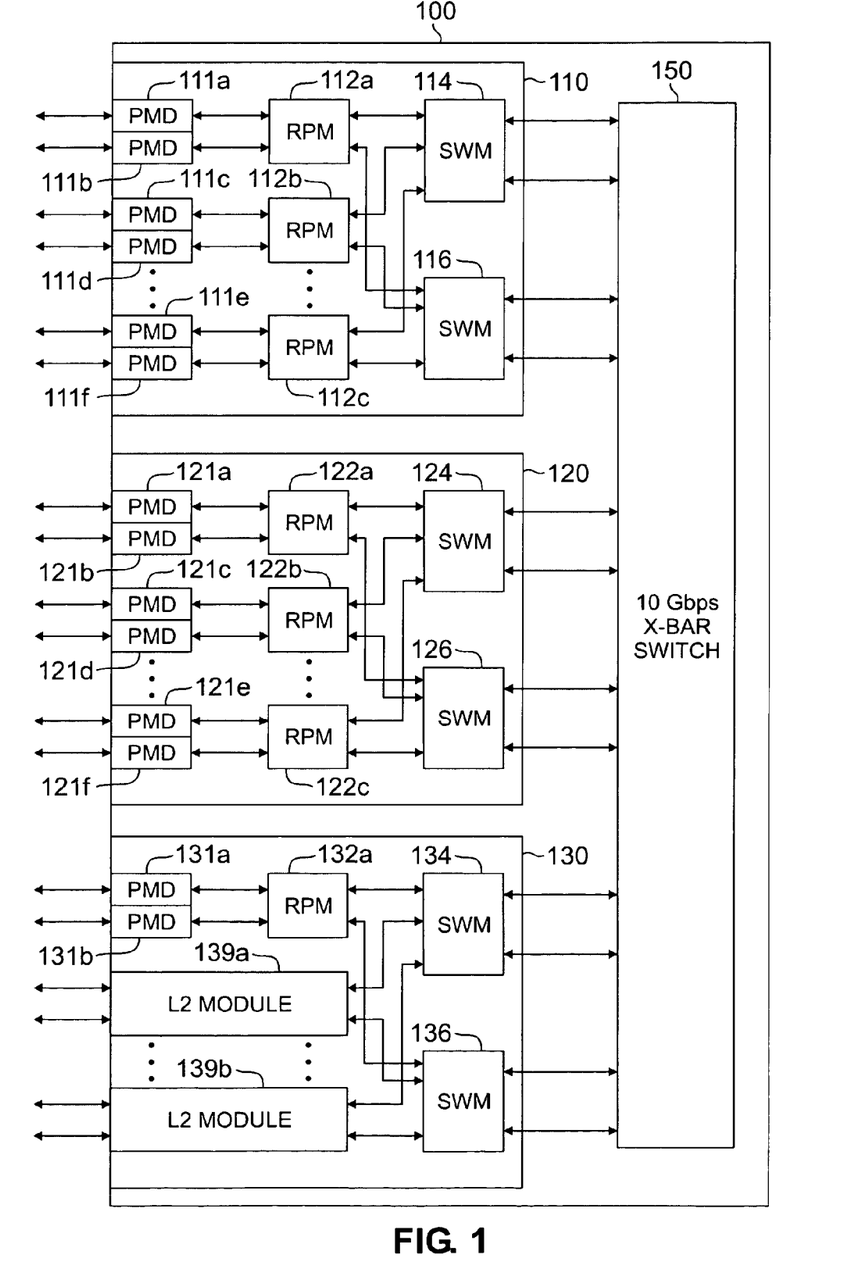
FIG. 1 illustrates an exemplary distributed architecture router, which distributes forwarding table lookup operations across a plurality of microengines and threads according to the principles of the present invention.

FIG. 1 illustrates exemplary distributed architecture router 100, which distributes forwarding table lookup operations across a plurality of microengines and threads according to the principles of the present invention. According to the exemplary embodiment, router 100 comprises N rack-mounted shelves, including exemplary shelves 110, 120, and 130, that are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route-processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
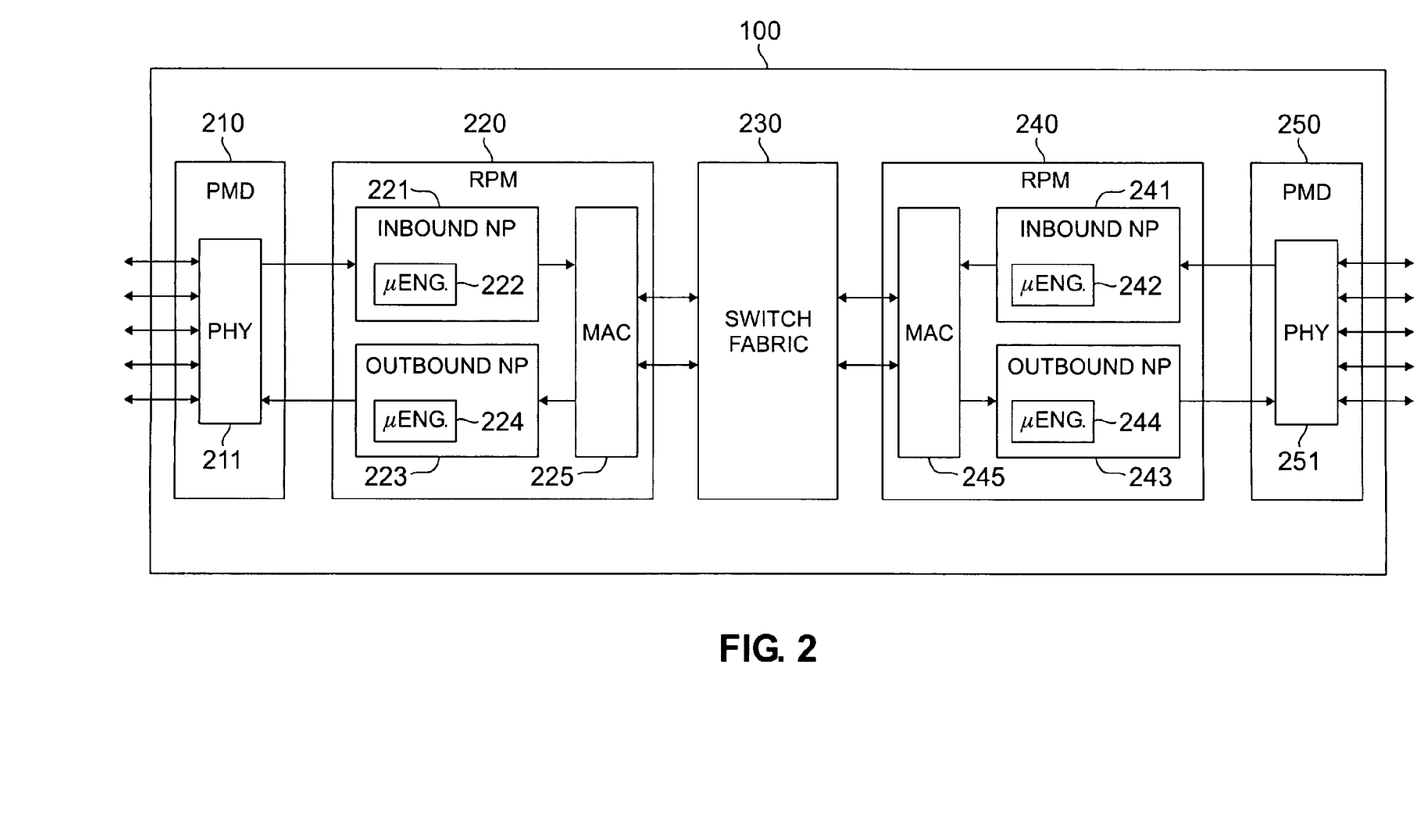
FIG. 2 illustrates selected portions of the exemplary router in FIG. 1 in greater detail according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (µEng.) 222 and outbound NP 223 comprises N microengines (µEng.) 224. Similarly, inbound NP 241 comprises N microengines (µEng.) 242 and outbound NP 243 comprises N microengines (µEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a single RISC processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table from its own memory space. This eliminates memory contention problems.

Figure 3:
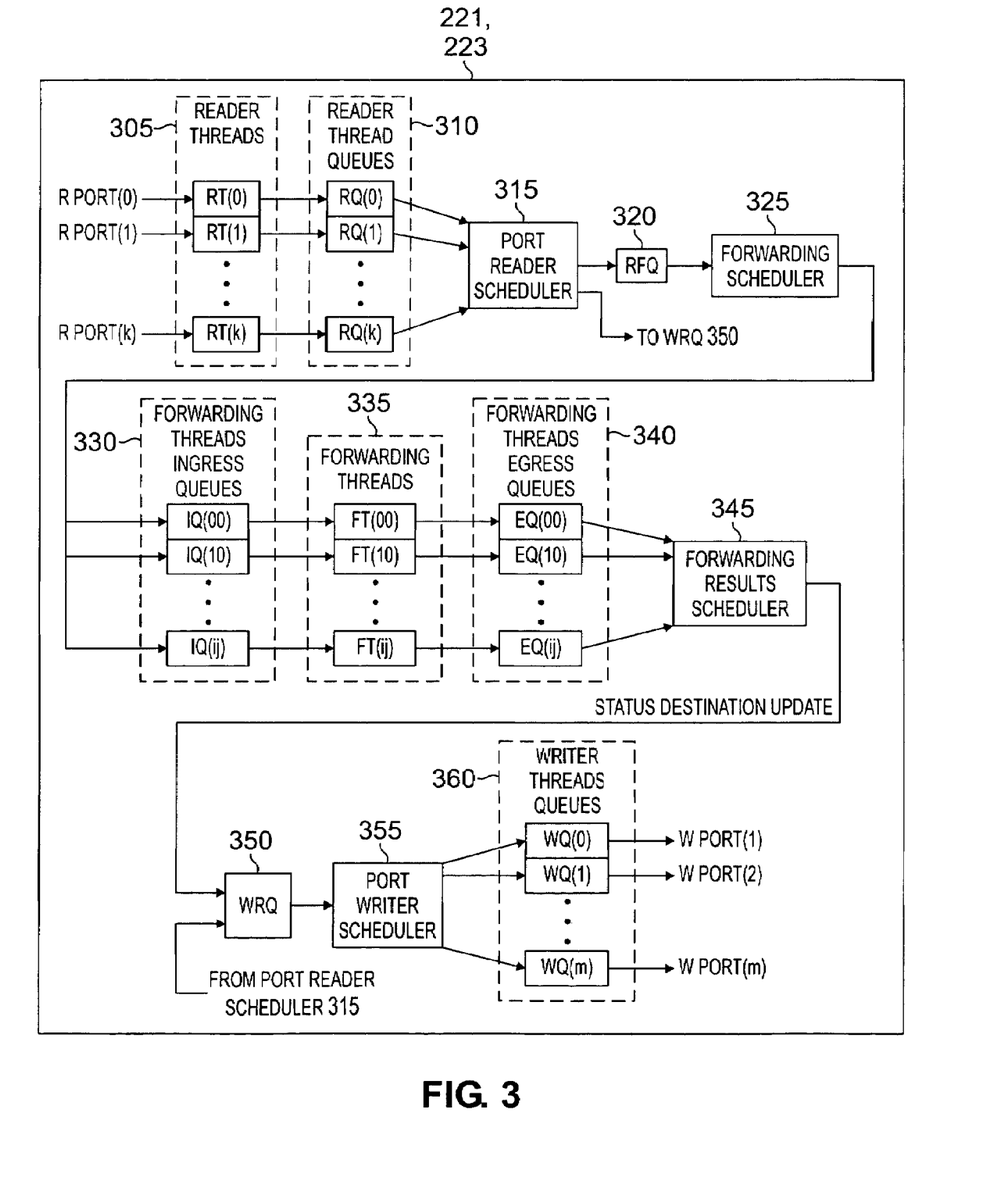
FIG. 3 illustrates the functional allocation of data packet forwarding operations to microengine threads according to an exemplary embodiment of the present invention.

FIG. 3 illustrates the functional allocation of data packet forwarding operations to microengine threads in an exemplary network processor according to an exemplary embodiment of the present invention. The exemplary network processor in FIG. 3 may be an inbound network processor (e.g., NP 221) or an outbound network processor (e.g., NP 223). The term "ingress" in FIG. 3 indicates a data packet that is entering a microengine, whether that data packet is inbound or outbound with respect to the route processing module and router 100. The term "egress" in FIG. 3 indicates a data packet is exiting a microengine, whether that data packet is inbound or outbound with respect to the route processing module and router 100.

The microengines in the inbound and outbound network processors (NPs) process packets in the data plane. The microengines execute i) reader threads 305 that read packets from the input ports, ii) forwarding threads 335 that search the forwarding tables, and iii) writer threads 355 that write packets to the output ports. In FIG. 3, K exemplary reader threads (RTs) (e.g., RT[0], RT[1], ..., RT[k]) read data packets from K ports (e.g., R Port[0], R Port[1], ..., R Port[k]) of the exemplary network processor. The reader threads store the data packets in K reader thread queues (RQs) 310 (e.g., RQ[0], RQ[1], ..., RQ[k]). For simplicity there is a 1-to-1 correspondence between ports, reader threads, and reader queues. In alternate embodiments of the present invention, some correspondence other than a 1-to-1 correspondence may be used between ports, reader threads, and reader queues, with a corresponding increase in complexity.

If multiple threads read data packets, then the multiple read threads must provide the data packets to a single scheduler thread that allocates packets to the forwarding threads. In FIG. 3, port reader scheduler thread 315 and forwarding thread scheduler 325 are shown as separate entities, but these processes may be combined into a single thread that performs both functions. Port reader scheduler thread 315 puts data packets in reader forwarding queue (RFQ) 320 and forwarding scheduler thread 325 retrieves data packets from RFQ 320. Port reader scheduler also places data packets into write results queue (WRQ) 350 for later handling by the port write scheduler 355.

Similarly, if multiple threads write packets, then the multiple write threads must provide the data packets to a single scheduler thread that allocates packets to the writer threads. In FIG. 3, forwarding results scheduler thread 345 and port writer scheduler thread 355 are shown as separate entities, but these processes may be combined into a single thread that performs both functions. Forwarding results scheduler thread 345 updates status of the packets in writer results queue (WRQ) 350 informing the port write scheduler 355 that they are ready for output. The port writer scheduler thread 355 retrieves data packets from WRQ 350 and outputs them to the destination write port, W Port[i]. The number of microengines and threads allocated to each of these functions is based on the performance requirements and varies between designs.

The microengines of the inbound NP read from the network interface ports and the control plane and write to the switch ports and the control plane. The microengines of the outbound NP read from the switch ports and the control plane and write to the network interfaces and the control plane.

Each reader microengine utilizes at least four threads: one or more port reader threads, a control plane receiver thread, a table change thread, and a scheduler thread. The reader microengine has the responsibility of reading inbound packets, then assigning those packets to a forwarding thread of one of the forwarding microengines.

Each forwarding microengine has an identical number of forwarding threads assigned to forwarding packets. In FIG. 3, forwarding scheduler thread 325 stores data packets in forwarding thread ingress queues 330. Forwarding threads ingress queues 330 include exemplary ingress queues IQ[00], IQ[10], ..., IQ[ij]. Forwarding threads 335 retrieve data packets from forwarding threads ingress queues 330 and store the data packets in forwarding threads egress queues 340. Forwarding threads 335 include exemplary forwarding threads FT[00], FT[10], ..., FT[ij]. Forwarding threads egress queues 340 include exemplary egress queues EQ[00], EQ[10], ..., EQ[ij]. Forwarding results scheduler thread 345 retrieves data packets from forwarding threads egress queues 340 and updates the data packets in writer results queue (WRQ) 350.

Individual threads of a forwarding microengine are designated FT[ij], where i is the forwarding microengine index value and j is the thread index value for the specified forwarding microengine. All queues and associated pointers used between microengines are kept in scratch pad memory inside each network processor. Each active queue entry is associated with a packet descriptor (PD) pointer. Packet descriptors are used in the queues to avoid copying of packets within the network processor. Thus, as a packet moves from thread to thread within the network processor, only a packet descriptor must be written into the queue. Each PD contains information used in the movement of a packet through a microengine. The packet descriptor contains a pointer to the packet buffer, a packet classification type, the packet sequence number for the classification type, and a packet processing status. The maximum number of packet descriptors loaded into a queue is always one less than the number of available entries. In other words, a queue with 4 slots will only hold 3 pointers. The queue is considered full if:

Inbound Reader Queue Index=$mod$ (Inbound Writer Queue Index+1, queue size).

Within a particular forwarding engine, forwarding scheduler thread 325 is responsible for selecting a forwarding thread, FT[ij], from one of the forwarding threads of the forwarding microengine. Forwarding thread load balancing is done using a round-robin search algorithm. Specifically, forwarding thread FT[i0] is initially examined on each forwarding microengine, then forwarding thread FT[i1], then forwarding thread FT[i2], and so forth.

However, workload distribution is first performed across microengines and then across threads. Let M be the highest microengine number used for forwarding and let N be one less than the number of forwarding threads per microengine.

Thus, the selection of the microengines and threads is as follows:

1st Pass—(µEng1, thread0), (µEng2, thread0), . . . , (µEngN, thread0)
2nd Pass—(µEng1, thread1), (µEng2, thread1), . . . , (µEngN, thread1)
. . .
M Pass—(µEng1, threadM), (µEng2, threadM), . . . , (µEngN, threadM)

This algorithm distributes one data packet to each microengine before looping back to distribute a second data packet to any microengine. This spreads the workload evenly among all microengines first. Distributing data packets to all of the threads of a first microengine before moving on to a second microengines is inferior because it tends to result in uneven distribution among microengines.

Each writer microengine utilizes at least two threads: an input scheduler thread that includes handling of forwarding table changes and one or more write threads. The writer function has the responsibility of handling table changes and of writing outgoing packets. The writer function uses two threads—an input processor thread that includes forwarding table change support and a writer thread. A writer microengine thread continually scans the forwarding thread egress queues 340. If an FT[ij] has output, the output is handled by the writer microengine. Then the next round robin outbound forwarding thread is examined for availability of a packet. The round robin order is the same for the writer function as it is for the reader function.

There are three classes of packet descriptors that the microengines process: IPv4, IPv6, and MPLS. Within each class the ingress packet sequence to the reader microengine must match the egress packet sequence from the writer microengine. This means that IPv4 sequence must be maintained, IPv6 sequence must be maintained, and MPLS sequence must be maintained. Associated with each packet type is an inbound traffic queue to the writer, as illustrated in FIG. 4.

Figure 4:
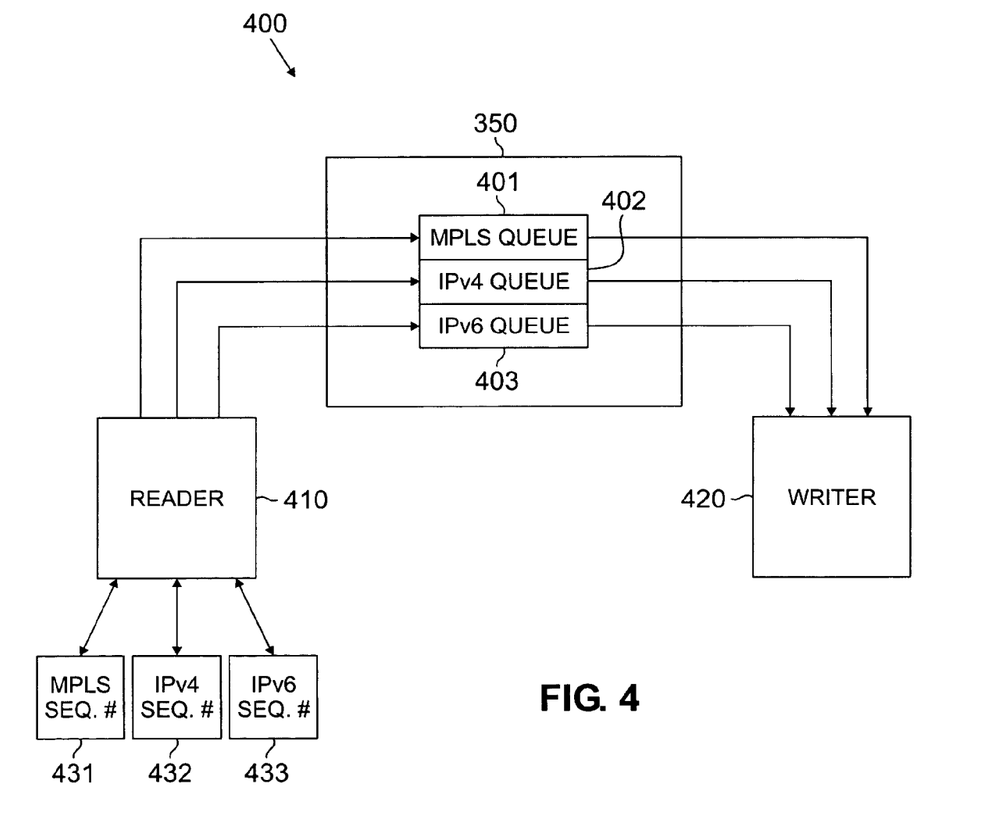
FIG. 4 illustrates packet type sequencing queues according to an exemplary embodiment of the present invention.

FIG. 4 illustrates packet type sequencing queues in an exemplary network processor according to an exemplary embodiment of the present invention. Reader microengine 410 stores data packets in packet class queues 350, such as MPLS queue 401, IPv4 queue 402, and IPv6 queue 403 that are used to maintain packet sequencing for each packet class. Writer microengine 420 retrieves data packets from MPLS queue 401, IPv4 queue 402, and IPv6 queue 403. The inbound microengine scheduling thread must classify the inbound data packet. If the packet class (MPLS, IPv4, or IPv6) is not recognized, the scheduler discards the data packet. Since a defective packet is discarded by the reader microengine, no sequence number is assigned to the defective packet. Therefore, defective data packets do not cause sequence problems.

For each message type, reader microengine 410 keeps a running count that is used for the packet sequence number (i.e., MPLS sequence number 431, IPv4 sequence number 432, IPv6 sequence number 433). The sequence number is passed to writer microengine 420 in the packet descriptor in write queue entry 350. These packet class queues keep the reader and writer message classes in the correct order. Associated with each entry in the class queues is a status that indicates the processing state of the corresponding packet. The forwarding thread 335 writes the status to complete and writes the forwarding destination when the forwarding destination has been determined and the packet is ready to be output. The status value and destination are updated by forwarding results scheduler 345 in the packet descriptor in the packet class queue 350, such as MPLS queue 401, IPv4 queue 402, or IPv6 queue 403.

Figure 5:
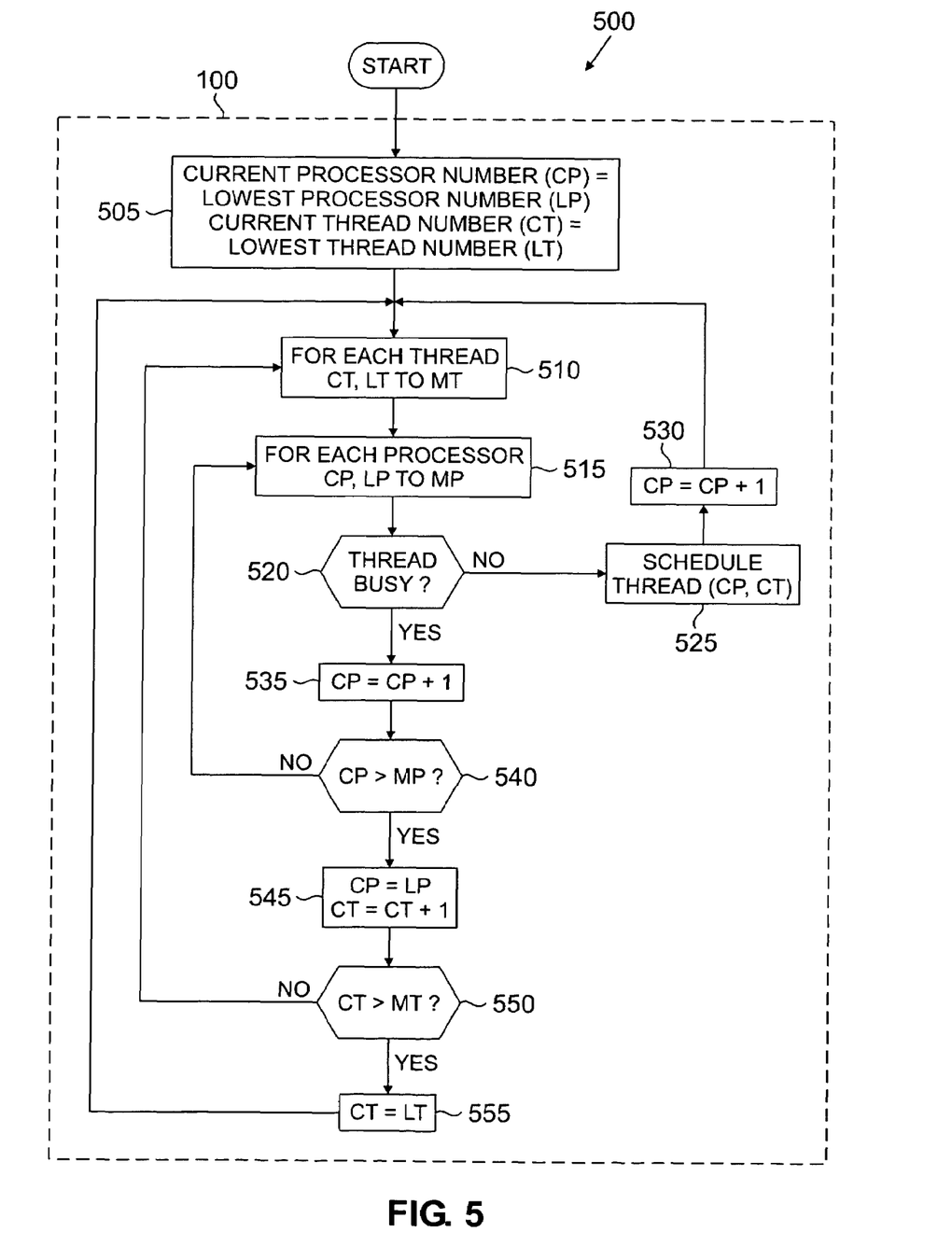
FIG. 5 is flow diagram illustrating the distribution of data packets across threads and microengines according to the principles of the present invention.

FIG. 5 depicts flow diagram 500, which illustrates the distribution of data packets across threads and microengines in router 100 according to the principles of the present invention. Initially, the current processor number (CP) is equal to the lowest processor number (LP) and the current thread number (CT) is equal to the lowest thread number (LT) (process step 505). CP identifies the current microengine that receives the next data packet. CT identifies the current thread that receives the next data packet.

Flow diagram 500 comprises an inner loop, which distributes data packets across different microengines, and an outer loop, which distributes data packets across different threads. The inner loop comprises blocks 515, 520 525, 530, 535 and 540. The outer loop comprises blocks 510, 545 550, and 555.

For each new data packet, forwarding scheduler thread 325 checks to see if the current thread (CP, CT) of the current [ith] microengine is busy (process step 520). If the current thread (CP, CT) is not busy, the current [jth] thread is scheduled to handle the data packet (process step 525) and the value of CP is incremented to point to the same [jth] thread in the next microengine (process step 530). The process then loops back to process step 510 and continues for the next data packet.

If the current thread (CP, CT) is busy, the value of CP is incremented to point to the same [jth] thread in the next [(i+1)th] microengine (process step 535). The value of CP is compared to a Maximum Processor (MP) threshold value to see if the loop has gone past the last available microengine (process step 540). If the value of CP does not exceed the value of MP, the process loops back to step 515 and the same [jth] thread in the next [(i+1)th] microengine is examined to see if it is busy (process step 520).

The inner loop repeats until the value of CP exceeds MP. At this point, a data packet has been distributed to a thread [jth] in each of the microengines. Next, the value of CP is set equal to LP again and the value of CT is incremented (process step 545). This returns forwarding scheduler thread 325 to the next [(j+1)th] thread in the first (i=LP) microengine. The value of CT is compared to a Maximum Thread (MP) threshold value to see if the outer loop has gone past the last available thread in the first microengine (process step 550).

If the value of CT does not exceed the value of MT, the process loops back to step 510 and the next [(j+1)th] thread in the next microengine is examined to see if it is busy (process step 520). If the value of CT does exceed the value of MT, the value of CT is set equal to LT (process step 555) and the process loops back to step 510. The whole process then repeats, beginning with the first thread in the first microengine.

The present invention provides a straight round robin distribution mechanism, regardless of packet type, and in a strict order of reception. In alternate embodiments, the present invention may put data packets into packet type queues, then do a round robin for forwarding table assignment across packet types, such as IPv4, IPv6, and MPLS. It is possible to give precedence to some packet types over others by various methods. A weighted servicing may be implemented, wherein some packet type queues are serviced more frequently than others. For example, the MPLS queue may be serviced twice as often as the IPv4 or IPv6 queues, by a scheme such as IPv4, MPLS, IPv6, MPLS, IPv4, etc.

In another embodiment, the network processors may service each packet type based on queue depth. For example, when an upper queue threshold is exceeded a packet type queue is served more often and when the queue falls below a lower threshold, the packet type queue is serviced less often. Regardless of the type of traffic priority used, the present invention permits the processing resources to be fully used for any type of traffic mixture, because each forwarding thread, as well as each reader, writer, and scheduling thread, can be used to process any packet type.

The current implementation uses a consecutive range of microengine numbers and a fixed number of threads in each microengine. Flexibility may be added by cycling through a table of sequences of (microengine #, thread #). This allows any distribution order to microengines and threads desired, as well as allowing any microengines to be used and allowing different numbers of threads per microengine.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting external devices coupled to said router, said router comprising:
a switch fabric; and a plurality of routing nodes coupled to said switch fabric, wherein each of said plurality of routing nodes comprises packet processing circuitry capable of transmitting data packets to, and receiving data packets from, said external devices and further capable of transmitting data packets to, and receiving data packets from, other ones of said plurality of routing nodes via said switch fabric, wherein said packet processing circuitry comprises a first network processor comprising:
N microengines capable of forwarding said data packets, each of said microengines capable of executing a plurality of threads that perform forwarding table lookup operations; and
workload distribution circuitry capable of distributing data packets to said N microengines for forwarding;
wherein said each microengine is capable of forwarding data packets of different traffic types; wherein said different traffic types comprise IPv4, IPv6 and MPLS.

2. The router as set forth in claim 1 wherein said first network processor comprises a reader microengine for receiving data packets into said first network processor and a writer microengine for transmitting said data packets from said first network processor.

3. The router as set forth in claim 2 wherein said first network processor transmits data packets of a first traffic type in the same order that said data packets of said first traffic type were received.

4. The router as set forth in claim 3 wherein said workload distribution circuitry distributes a data packet to a first thread executed by each of said microengines before distributing a data packet to a second thread executed by any of said each microengines.

5. The router as set forth in claim 3 wherein said workload distribution circuitry distributes a data packet to a first thread executed by each of said microengines according to a round-robin algorithm.

6. The router as set forth in claim 5 further comprising a second network processor similar to said first network processor, wherein said first network processor transfers data packets from said switch fabric to external ports of said router and said second network processor transfers data packets from said external ports of said router to switch fabric.

7. A communication network comprising a plurality of routers that communicate data packets to one another and to interfacing external devices, each of said plurality of routers comprising:
a switch fabric; and a plurality of routing nodes coupled to said switch fabric, wherein each of said plurality of routing nodes comprises packet processing circuitry capable of transmitting data packets to, and receiving data packets from, said external devices and further capable of transmitting data packets to, and receiving data packets from, other ones of said plurality of routing nodes via said switch fabric, wherein said packet processing circuitry comprises a first network processor comprising:
N microengines capable of forwarding said data packets, each of said microengines capable of executing a plurality of threads that perform forwarding table lookup operations; and
workload distribution circuitry capable of distributing data packets to said N microengines for forwarding;
wherein said each microengiine is capable of forwarding data packets of different traffic types; wherein said different traffic types comprise Ipv4, Ipv6 and MPLS.

8. The communication network as set forth in claim 7 wherein said first network processor comprises a reader microengine for receiving data packets into said first network processor and a writer microengine for transmitting said data packets from said first network processor.

9. The communication network as set forth in claim 8 wherein said first network processor transmits data packets of a first traffic type in the same order that said data packets of said first traffic type were received.

10. The communication network as set forth in claim 9 wherein said workload distribution circuitry distributes a data packet to a first thread executed by each of said microengines before distributing a data packet to a second thread executed by any of said each microengines.

11. The communication network as set forth in claim 9 wherein said workload distribution circuitry distributes a data packet to a first thread executed by each of said microengines according to a round-robin algorithm.

12. The communication network as set forth in claim 11 further comprising a second network processor similar to said first network processor, wherein said first network processor transfers data packets from said switch fabric to external ports of said router and said second network processor transfers data packets from said external ports of said router to switch fabric.

13. For use in a router comprising a switch fabric and a plurality of routing nodes coupled to the switch fabric, each of the routing nodes capable of transmitting data packets to, and receiving data packets from, external devices and transmitting data packets to, and receiving data packets from, other routing nodes via the switch fabric, a method of distributing data packets for forwarding comprising the steps of:
receiving a plurality of data packets in a first network processor of a first routing node, the first network processor comprising N microengines capable of forwarding the data packets, each of the microengines capable of executing a plurality of threads that perform forwarding table lookup operations;
allocating a first data packet to a first thread in each of the N microengines; and after said first step of allocating, allocating a second data packet to a second thread in each of the N microengines;
wherein each of the microengines is capable of forwarding data packets of different traffic types; wherein the different traffic types comprise Ipv4, Ipv6 and MPLS.

14. The method as set forth in claim 13 further comprising the steps of transmitting from the first network processor data packets of a first traffic type in the same order that the data packets of the first traffic type were received.

* * * * *

UNITED STATES PATENT AND TRADEMARK OFFICE
CERTIFICATE OF CORRECTION

| | | |
|---|---|---|
| PATENT NO. | : 7,474,661 B2 | Page 1 of 1 |
| APPLICATION NO. | : 10/811411 | |
| DATED | : January 6, 2009 | |
| INVENTOR(S) | : Patricia K. Sturm, Patrick W. Ireland and Jack C. Wybenga | |

It is certified that error appears in the above-identified patent and that said Letters Patent is hereby corrected as shown below:

Column 12, claim 7, line 12, delete "microengiine" and replace with --microengine--.

Signed and Sealed this

Eighteenth Day of August, 2009

David J. Kappos
*Director of the United States Patent and Trademark Office*